(12) United States Patent  (10) Patent No.: US 9,413,144 B1
Ledbetter et al.  (45) Date of Patent: Aug. 9, 2016

(54) PORTABLE RACKING TOOL FOR ELECTRIC EQUIPMENT REPLACEMENT

(76) Inventors: Ashley Sue Ledbetter, Argyle, TX (US); Finley Lee Ledbetter, Argyle, TX (US)

( * ) Notice: Subject to any disclaimer, the term of this patent is extended or adjusted under 35 U.S.C. 154(b) by 1456 days.

(21) Appl. No.: 13/047,332

(22) Filed: Mar. 14, 2011

Related U.S. Application Data

(63) Continuation-in-part of application No. 12/563,027, filed on Sep. 18, 2009, now Pat. No. 8,261,433.

(51) Int. Cl.
*H02B 3/00* (2006.01)
*H02B 11/127* (2006.01)

(52) U.S. Cl.
CPC ............... *H02B 3/00* (2013.01); *H02B 11/127* (2013.01); *Y10T 29/49822* (2015.01); *Y10T 29/53248* (2015.01); *Y10T 29/53283* (2015.01); *Y10T 29/53909* (2015.01); *Y10T 29/53943* (2015.01)

(58) Field of Classification Search
CPC .. H02B 11/127; H02B 3/00; Y10T 29/49822; Y10T 29/53909; Y10T 29/53248; Y10T 29/53943; Y10T 29/53283
See application file for complete search history.

(56) References Cited

U.S. PATENT DOCUMENTS

| | | | |
|---|---|---|---|
| 3,716,684 A * | 2/1973 | McMillen et al. | 200/50.21 |
| 5,397,869 A | 3/1995 | Huen | |
| 5,453,587 A | 9/1995 | Hurley et al. | |
| 5,465,031 A | 11/1995 | Nilssen | |
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 * | 10/2005 | Miller | 200/50.21 |
| 7,019,230 B1 | 3/2006 | Vaill et al. | |
| 2005/0194243 A1 | 9/2005 | Prineppi | |
| 2012/0055765 A1 * | 3/2012 | Zylstra et al. | 200/50.24 |

* cited by examiner

*Primary Examiner* — Livius R Cazan
(74) *Attorney, Agent, or Firm* — Gardere Wynne Sewell LLP (57) ABSTRACT

A portable racking tool for the installation and removal of electrical equipment, such as circuit breakers, is disclosed herein. Also disclosed is a method of using the portable racking tool. The portable racking tool can be lightweight and rugged for providing electrically operated controlled installation and removal of electrical equipment by an operator from a remote location using a coupling for engagement with the electrical equipment.

18 Claims, 10 Drawing Sheets

\# PORTABLE RACKING TOOL FOR ELECTRIC EQUIPMENT REPLACEMENT

CROSS REFERENCE TO RELATED APPLICATIONS

The present application is a continuation-in-part of U.S. Pat. No. 8,261,433 filed on Sep. 18, 2009, entitled "Portable Racking Tool For Electric Equipment Replacement And Method For Replacing Electrical Components", which is incorporated herein in its entirety.

FIELD

The present embodiments generally relate to a portable and easy to move racking tool that can be used with electrical equipment, such as to charge, close, or trip individual electrical units in a facility.

BACKGROUND

A need exists for a lightweight portable racking tool that can prevent harm to operators while working on electrical equipment that is susceptible to arcing during testing, maintenance, replacement, repair, or the like.

A need exists for a racking tool that can be lifted with a single hand and used for performing testing, maintenance, replacement, repair, or the like. For example, the racking tool can be used to replace one or more portions of electrical equipment in a circuit breaker room on a piece-by-piece basis, without shutting down power to the entire facility; thereby allowing facilities to continue operating critical equipment.

Large facilities, such as hospitals, power plants, and hotels, often have to shut down all power in the facility for one or more hours in order to test, maintain, replace, or repair circuit breakers in a switching room due to arcing that can occur when the power is not shut down. For example, a hotel might have to shut off power, such as from 3:00 AM to 4:30 AM at least once a year, to replace used or worn equipment. Hotels often have pilots and other guests staying with them that need to be awake at 4:00 AM, and such power interruptions will encourage these guests to stay at another hotel that night, leading to a loss of revenue.

Hospitals that need to shut down power to perform similar operations need to provide back up power to emergency rooms, life support facilities, and intensive care units, such as where patients are on breathing machines. The time, scheduling, and costs involved can be immense, and loss of patient life can occur if something goes wrong.

However, if no shut down is performed, the switching room can generate "arcs" of electricity that can cause severe burns to operators that are manually installing or removing the electrical equipment.

A need has long existed for a portable racking tool that can be operated by a person without needing to shut down power to the facility to install and remove circuit breakers or similar "electric arc" producing equipment.

The present embodiments meet these needs.

BRIEF DESCRIPTION OF THE DRAWINGS

The detailed description will be better understood in conjunction with the accompanying drawings as follows.

The present embodiments are detailed below with reference to the listed figures.

DETAILED DESCRIPTION OF THE EMBODIMENTS

Before explaining the present system and method in detail, it is to be understood that the system and method are not limited to the particular embodiments, and that the embodiments can be practiced or carried out in various ways.

The present embodiments relate to a racking tool for removing, installing, switching, maintaining, and testing electrical equipment. The racking tool can be a portable racking tool. The electrical equipment can be surrounded by a magnetic metal surface or another magnetic surface, upon which the racking tool can be engaged for operation on the electrical equipment.

The electrical equipment can be a low voltage circuit breaker, a medium voltage circuit breaker, a switch gear, a motor control center, a contactor, or other electrical equipment. For example, the electrical equipment can be a low voltage DC power circuit breaker, a low voltage AC circuit breaker that does not exceed 480 volts, or a medium voltage circuit breaker that operates from about 400 volts to about 15 kilovolts.

The racking tool can be used on offshore platforms for increased safety, such as with oil platforms in the Gulf of Mexico. The racking tool can help prevent disasters at sea caused by fire related to arc flashing, thereby preventing oil spills associated with fires. For example, disaster control on offshore platforms can be improved using the racking tool by preventing hazards associated with arc flashing in control room circuit breakers that power hoists, tubular make up devices, rotary tables, spiders, motors, generators, pumps that ballast platforms, and other portions of offshore platforms.

The racking tool can enable an operator to install and remove electrical equipment without needing to wear full body arc flash hazard suits. The racking tool can be used to easily maintain equipment without needing to shut down the entire facility during such maintenance. For example, a single circuit breaker can be shut down and replaced while the remainder of circuit breakers on a bus of circuit breakers can remain operational.

The racking tool can be operated by a user without detailed training. For example, an unskilled worker can quickly and easily use the racking tool, enabling a wide variety of plant personnel, trained and untrained, to perform maintenance functions safely.

The racking tool can be operated remotely, preventing explosions, flames, and arc flashes from reaching a person.

The racking tool can be made of a lightweight metal. For example, the racking tool can weigh less than 40 pounds. The racking tool can be modular, with each component of the racking tool being removable and replaceable within a few minutes of failure. In one or more embodiments, the racking tool can be about 24 inches long, about 24 inches wide, and about 24 inches deep, allowing the racking tool to be used in small, tight places.

The racking tool can have a motor mount plate. The motor mount plate can have a motor side, a magnet side, and an electrical equipment side. The motor side can be connected to the magnet side, such as at a right angle. The electrical equipment side can be connected to the magnet side, such as at a right angle. The electrical equipment side can extend parallel to the motor side.

The motor side can have a motor side opening. The motor side opening can be a circular hole or any other shaped hole disposed through the motor side that can be configured to receive a portion of a gear box and/or an alignment tool.

In one or more embodiments, a plurality of motor mount holes can be disposed around the motor side opening in the motor mount plate. The plurality of motor mount holes can be configured to receive one or more fasteners for attaching the gear box to the motor side.

The electrical equipment side can have a first opening that can be a rectangular hole or any other shaped hole disposed through the electrical equipment side and configured to allow an electrical equipment handle of the electrical equipment to pass therethrough.

A second opening can be disposed through the electrical equipment side, which can be a square hole or any other shaped hole. The second opening can be configured to allow viewing of an indicator on the electrical equipment.

A third opening can be disposed through the electrical equipment side, which can be a circular hole or any other shaped hole. The third opening can be axially and concentrically aligned with the motor side opening, and can be configured to allow a coupling to pass therethrough from the gear box to engage the electrical equipment.

The magnet side can have at least one magnet side mounting hole, such as a hole configured to receive a screw, bolt, or another fastener. The magnet side can be disposed between the motor side and the electrical equipment side.

The motor mount plate, with the magnet side, the electrical equipment side, and the motor side, can be a one-piece structure or can be multiple plates welded or otherwise connected to one another.

A motor, and/or the gear box engaged with the motor, can be mounted to the motor mount plate. The motor can be a variable speed motor. The motor can be rotatably or otherwise operatively engaged with the gear box.

The gear box can include a shaft housing with a gear box keyway. The shaft housing can be configured to receive and operatively engage a rotatable shaft, which can be made of steel. The rotatable shaft can include a shaft keyway with a key. The gear box keyway can be configured to receive and operatively engage the key and the shaft keyway. The gear box can be configured to rotate the rotatable shaft, such as in a clockwise or counter clockwise direction. The rotatable shaft can receive torque from the gear box. The rotatable shaft can extend through the motor mount plate and be engaged with a torque limiting clutch. In one or more embodiments, the rotatable shaft can be from about 2 inches to about 8 inches in length, and can have a diameter configured to fit within the gear box.

A coupling can be connected to the torque limiting clutch on one end, and to the electrical equipment on the other end. The coupling can transfer rotational force from the rotatable shaft and the torque limiting clutch to a portion of the electrical equipment for installing and/or removing the electrical equipment. For example, the electrical equipment can be installed and/or removed by using the coupling to rotate a portion of the electrical equipment, causing engagement or disengagement of that portion of the electrical equipment from the remainder of the piece electrical equipment. The coupling can be a socket.

The racking tool can include a control bracket that can be mounted to the motor and/or to the gear box. The control bracket can be made of a lightweight metal. The control bracket and the motor mount plate can each be made of lightweight metal plates that can be from about $1/16^{th}$ of an inch thick to about $1/2$ of an inch thick. The control bracket and the motor mount plate can also be made of steel, stainless steel alloy, graphite composite, aluminum plate, high density polyethylene, high density polypropylene with reinforcing bars, or a rigid durable non-deformable polymer configured to withstand a temperature of at least 250 degrees Fahrenheit without deforming. In one or more embodiments, one or more portions of the racking tool can be coated with a material that prevents the build up of ionic charges. The control bracket can have a width and length that extends over both the gear box and the motor.

The control bracket can include a control bracket base, which can be a plate. The control bracket base can have a hole. The hole can be axially and concentrically aligned with the motor side opening, such that the alignment tool can pass through the hole for engagement with a portion of the gear box.

A plurality of mounting holes can be disposed around the hole in the control bracket base. The plurality of mounting holes can be configured to receive fasteners for attaching the control bracket to the gear box. The plurality of mounting holes can be axially and concentrically aligned with the plurality of motor mount holes for receiving the same fasteners simultaneously.

The control bracket can include a handle side. The handle side can be formed at an angle from about 80 degrees to about 120 degrees from the control bracket base. In one or more embodiments, the handle side can extend perpendicular to the control bracket base. A handle can be connected to the handle side. The handle can extend away from the control box mount side and the handle side. The handle can be configured for gripping by the operator. The handle can be made of a material configured to provide electrical insulation to prevent shock to the operator, such as plastic, reinforced composite, rubber coated metal, or the like.

The control bracket can include a control box mount side that can be engaged with the control bracket base at an angle from about 80 degrees to about 120 degrees from the control bracket base. In one or more embodiments, the control box mount side can extend perpendicular to the control bracket base and the handle side. The handle side, the control bracket base, and the control box mount side can be a one-piece structure, or multiple structures connected together.

A motor control housing can be secured to the control bracket. The motor control housing can include an interface plug configured to receive signals and power from a remote switch operator. The motor control housing can include a motor control circuit board that can be connected to the interface plug, and can be configured to transmit the signals and power to the motor. In operation, an operator can remotely communicate with the motor control housing using the remote switch operator to provide power thereto and to control the motor and the other portions of the racking tool for remote installation and removal of portions of electrical equipment. The motor control housing can be a six sided housing, including a top configured to be opened and closed.

In one or more embodiments, the motor control circuit board can be wirelessly connected to the motor, enabling for wireless communication therebetween using a remote wireless device. The remote wireless device can be a cell phone or a wireless device using radio frequencies, infrared frequencies, or ultra high frequencies. The remote wireless device can be in communication with the motor control circuit board through a network, such as the Internet, a local area network, a wide area network, a wireless network, or another global communications network.

The racking tool can include an alignment tool, which can be engaged with the rotatable shaft through the motor mount plate, such as through the motor side opening. The alignment tool can be configured to operatively engaged the coupling to rotate the coupling, and to align the coupling with the electrical equipment. For example, in order to operatively engage the portion of the electrical equipment, the coupling can be rotated until it is possible to engage the coupling over the portion of the electrical equipment.

A magnet housing, which can be removable and magnetically shielding, can be mounted to the magnet side. For example, a fastener can be engaged through the at least one magnet side mounting hole and with the magnet housing.

A magnet, such as a non-electric magnet, can be contained within the magnet housing. The magnet can be movable, removable, and engagable with metal surfaces or other magnetic surfaces surrounding electrical equipment. The magnet can have a magnet face, which can be smooth, for attaching to the magnetic surface surrounding the electrical equipment. The engagement between the magnet and the magnetic surface can reduce transfer of vibration and torque from the racking tool to the magnetic surface surrounding the electrical equipment.

In one or more embodiments, the magnet can have a magnet handle. The magnet handle can operatively engage the magnet. In operation, the magnet handle can be rotated to at least partially rotate the magnet into and out of the magnet housing, and to dispose the magnet closer to or farther from the magnetic surface. Use of the magnet to attach the racking tool allows for fast connection and disconnection of the racking tool from the electrical equipment, such as in the case of fire, arcing, or the like.

The racking tool can be operated remotely using the remote switch operator. The remote switch operator can be in wired or wireless communication with the motor control housing for sending power and control signals thereto.

The remote switch operator can include a housing with a body and a closable lid hinged to the body. The housing can be an explosion-proof or explosion-resistant housing that can be watertight and made of an impact resistant thermoplastic.

A first face plate and a second face plate can be disposed within the housing. The face plates can be made from coated steel and have a thickness of about ¼ of an inch.

A power plug can be engaged through the first face plate and configured to provide current from an AC or DC outside source.

A charger power supply can be disposed in the body beneath the first face plate and configured to respectively receive AC or DC current from the AC or DC outside source, which can provide a voltage of up to 27 volts.

A power and signal plug can be engaged through the first face plate and can be configured to transmit the power and control signals to the portable racking tool, such as through a power cord and/or wirelessly. The power cord can be configured to provide the power and control signals from the remote switch operator to the interface plug of the motor control housing.

The remote switch operator can have one or more batteries disposed beneath the first face plate and in communication with the charger power supply. The one or more batteries can be in communication with one or more relays. The one or more relays can be in communication with a circuit board. The circuit board can include a microprocessor, a flash memory, and one or more computer instructions.

A current control module can be disposed in the second face plate and in communication with the one or more relays, and with a transmitter/receiver. The transmitter/receiver can be in communication with a remote control device and/or with the motor control housing.

In one or more embodiments, the current control module and/or the circuit board can be custom-built with a processor, data storage, and computer instructions in a flash memory for comparing current to preset current limits, and for increasing or decreasing current based on commands input to a panel of the current control module or the circuit board. For example, the current control module or the circuit board can be a model RRS-1 available from RK Electronics of Cincinnati, Ohio. The current control module can be a circuit board disposed on an aluminum plate with a membrane overlay, at least a two digital displays, and a microprocessor with a flash memory for comparing sensed data to a predetermined threshold.

The first face plate can have various control buttons for providing various control signals to the racking tool. For example, the first face plate can have an install momentary push button that can be in communication with the circuit board, and can be used to send a control signal to the racking tool to perform an installation of a piece of electrical equipment by rotating the coupling. The first face plate can have a remove momentary push button engaged with the circuit board, and can be used to send a control signal to the racking tool to perform a removal of a piece of electrical equipment by rotating the coupling. The first face plate can have an on/off switch that can be used to connect and disconnect the one or more batteries of the remote switch operator. For example, a circuit breaker can be connected between the batteries and the circuit board, allowing for a disconnection thereof. The batteries can be configured to supply from about 12 volts to about 27 volts.

The remote control device can be used to remotely send and receive control signals using the transmitter/receiver. The remote control device can include an antenna for sending control signals to and receiving control signals from the transmitter/receiver. The remote control device can include a remote on-button and a remote off-button, which can be used to connect and disconnect the batteries of the remote switch operator. The remote control device can include a remote install button that can be used to send a control signal through the remote switch operator to the racking tool to perform an installation of a piece of electrical equipment by rotating the coupling. The remote control device can include a remote remove button that can be used to send a control signal through the remote switch operator to the racking tool to perform a removal of a piece of electrical equipment by rotating the coupling. The remote control device can include an automatic shut off switch that can be used to disable the portable racking tool when the portable racking tool exceeds a preset amperage. For example, the automatic shut off switch can send a control signal to the motor control housing to cease transmission of power to the motor. The remote switch operator can also have an automatic shut off switch.

In one or more embodiments, the racking tool can include a camera that can provide an image and/or video feed of the racking tool, the electrical equipment, and the arc flash zone. The camera can have one or more lights to provide light to the racking tool, the electrical equipment, and the arc flash zone. The camera can be in wired or wireless communication with a remote monitor, enabling the operator to safely view close up operation of the racking tool while remaining outside of the arc flash zone.

One or more embodiments relate to a method for racking electrical equipment. The method can include connecting a portable racking tool to a remote switch operator and setting a torque limiting clutch to a predetermined toque setting. The torque limiting clutch can be engaged with a motor in the portable racking tool.

The method can include aligning a coupling in the portable racking tool with electrical equipment needing maintenance, removal, or installation. The coupling can be connected to the torque limiting clutch.

The method can include securing a motor mount plate to a metal surface, holding the torque limiting clutch and the motor to the metal surface, enclosing the electrical equipment, flowing power from the remote switch operator to a motor control housing of the motor and to the motor, and rotating the gear assembly in the gear box to rotate the rotatable shaft supporting the torque limiting clutch.

The method can include rotating the coupling attached to the torque limiting clutch to remove or install the electrical equipment while an operator is remote to the portable racking tool.

Figure 1:
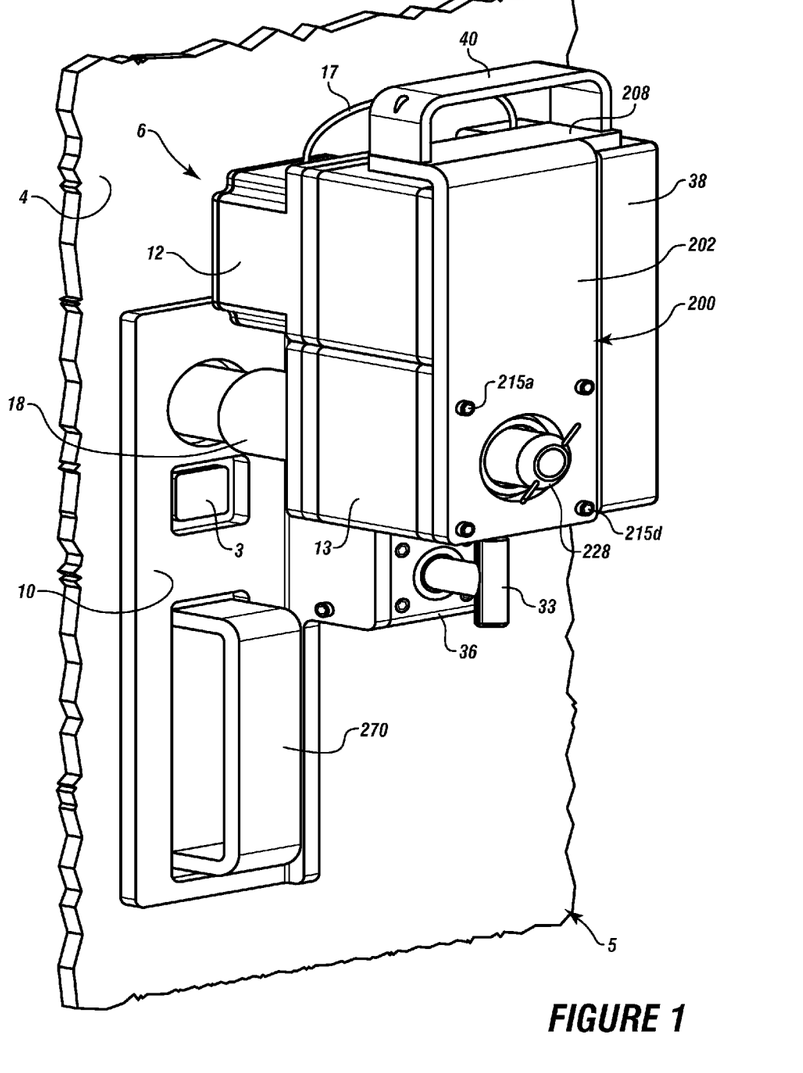
FIG. 1 depicts an assembled portable racking tool.

Turning now to the figures, FIG. 1 depicts an embodiment of the portable racking tool 6. The portable racking tool 6 can be about 24 inches in height by about 18 inches in width. The portable racking tool 6 can weigh from about 35 pounds to about 40 pounds, allowing it to be portable, hand held, and safer for a single person to operate without requiring two people to lift and install the portable racking tool. The portable racking tool 6 can be lightweight, allowing it to be used on workboats, cruise ships, in mines, at sea on offshore oil platforms, and to be carried up stairs.

The portable racking tool 6 can be engaged with a piece of electrical equipment 5 surrounded by a metal surface 4.

A motor mount plate 10 can provide a connection between the portable racking tool 6 and the electrical equipment 5. The motor mount plate 10 can be made from stainless steel. The motor mount plate 10 can be about ½ of an inch thick. The motor mount plate 10 can have a height of about 18 inches and a width of about 12 inches. The motor mount plate 10 can have a "C" shape, a "U" shape, an angular shape, or another shape.

The motor mount plate 10 can have a removable magnetically shielding magnet housing 36 for containing a non-electric magnet with a magnet handle 33. The removable magnetically shielding magnet housing 36 and the non-electric magnet with a magnet handle 33 can include a magnet available from Magswitch of Colorado. The non-electric magnet with a magnet handle can provide engagement between the motor mount plate 10 and the metal surface 4 surrounding the electrical equipment 5.

The non-electric magnet with a magnet handle 33 can be used to rotate the non-electric magnet within the removable magnetically shielding magnet housing 36, allowing a face of the non-electric magnet to contact the metal surface 4.

The engagement between the non-electric magnet and the metal surface 4 can reduce the transfer of torque and vibration from the portable racking tool 6 to the metal surface 4. In one or more embodiments, the engagement between the non-electric magnet and the metal surface 4 can cause a reduction of torque transfer of at least 25 percent. The engagement between the non-electric magnet and the metal surface 4 can reduce the vibration, causing the engagement to provide a flush connection between the non-electric magnet and the metal surface 4 during operation, and preventing lifting or separation of the non-electric magnet from the metal surface 4. As such, the engagement between the non-electric magnet and the metal surface 4 can provide a stable connection of the portable racking tool 6 to the electrical equipment 5.

A gear box 13 can be engaged with the motor mount plate 10. The gear box 13 can be operatively engaged with a motor 12 and with a torque limiting clutch 18. The gear box 13 can be an Oriental Motor USC Corp. gear box, part number BLH5100KC-200FR, available from Los Angeles, Calif., or a similar gear box.

The torque limiting clutch 18 can be one available from Perf-A-Torque clutch of Massachusetts, such as a Perf-A-Torque Model 12A. The torque limiting clutch 18 can be made of steel. The torque limiting clutch 18 can be different sizes depending on the size of the electric equipment 5 to be operated upon.

A control bracket 200 can be engaged with the gear box 13 and the motor 12. A handle side 208 can engage over a top portion of the gear box 13 and/or the motor 12. In one or more embodiments, the control bracket 200 can engage just the motor 12 or just the gear box 13. The control bracket 200 can be made of stainless steel that can be "L" shaped, having a side that is bent up against a bottom portion of the "L" shaped stainless steel. The control bracket 200 can be the same width as the motor mount plate 10, or can be slightly larger or slightly smaller. The control bracket 200 can be configured and sized such that it does not deform when the portable racking tool 6 is lifted using a handle 40.

The control bracket 200 can be fastened to the gear box 13 with one or more fasteners 215a and 215d. The fasteners 215a and 215d can be bolts with nuts, allowing for a fast engagement and removable, in case a replacement of a portion of the portable racking tool 6 is required. The fasteners 215a and 215d can be rivets or other fasteners.

The control bracket 200 can have a control bracket base 202, the handle side 208, and the handle 40 attached to the handle side 208.

The handle 40 can be used for easy lifting and aligning of the portable racking tool 6 with the electrical equipment 5 to be operated upon. The handle 40 can be a Bosch Rexroth handle, which can be partially plastic and partially metal. The handle 40 can be sturdy and non-deforming. The handle 40 can support the weight of the entire portable racking tool 6 without deforming.

An alignment tool 228 can be operatively engaged with the gear box 13, and thereby with the torque limiting clutch 18 through the motor mount plate 10. The alignment tool 228 can be one produced and sold by CBS Arcsafe, Inc. of Denton, Tex.

In operation, the motor control mount 10 can be mounted to the metal surface 4 surrounding the electrical equipment 5. Then the alignment tool 228 can be used to align the coupling with the electrical equipment 5. For example, the alignment tool 228 can be used to rotate the coupling engaged with the gear box 13 and the torque limiting clutch 18 to align the coupling with the electrical equipment 5.

An operator can send power and control signals to the motor 12 through a power and control cable 17 from a motor control housing 38, such as by using a remote switch operator. The motor control housing 38 can be a Hammond aluminum enclosure, such as those available from Allied Electronics of Fort Worth, Tex.

The motor 12 can be operatively engaged with the gear box 13, the gear box 13 can be operatively engaged with the torque limit clutch 18, and the torque limiting clutch 18 can be operatively engaged with a portion of the electrical equipment 5, such as through the coupling.

The operator can use the power and control signals to provide power to and operatively control the motor 12, the gear box 13, the torque limiting clutch 18; and to operatively engage the electrical equipment 5 for removing or installing the electrical equipment 5 while the operator is located remote from the portable racking tool 6 and outside of the arc flash zone.

The portion of the motor mount plate 10 connected to the portable racking tool 6 can have a first opening (shown in FIGS. 3A-3B) through which an electrical equipment handle 270 can extend, allowing access to the electrical equipment handle 270 by the operator. The first opening can vary in size, and can be about 6 inches by about 4 inches. The first opening can be large enough to accommodate the electrical equipment handle 270.

An indicator 3 of the electrical equipment 5 can be seen through a second opening (shown in FIGS. 3A-3B) in the motor mount plate 10, allowing the operator to view the indicator 3 during use of the portable racking tool 6. The indicator 3 can be disposed on the electrical equipment 5. The indicator 3 can be a dial that turns to indicate that the portable racking tool 6 is racking in or is racking out. The indicator 3 can allow the operator to ensure that the portable racking tool 6 is actually performing the operation that the operator intended. The second opening can be a round opening, and can have a diameter ranging from about 2 inches to about 6 inches. The second opening can also be square or rectangular to accommodate the indicator 3.

The torque limiting clutch 18 and/or the coupling can extend through a third opening (shown in FIGS. 3A-3B) in the motor mount plate 10 for engagement with the electrical equipment 5. The third opening can have a diameter ranging from about 2 inches to about 6 inches. The third opening can be square, round, or any shape that allows the coupling to extend therethrough.

Figure 2:
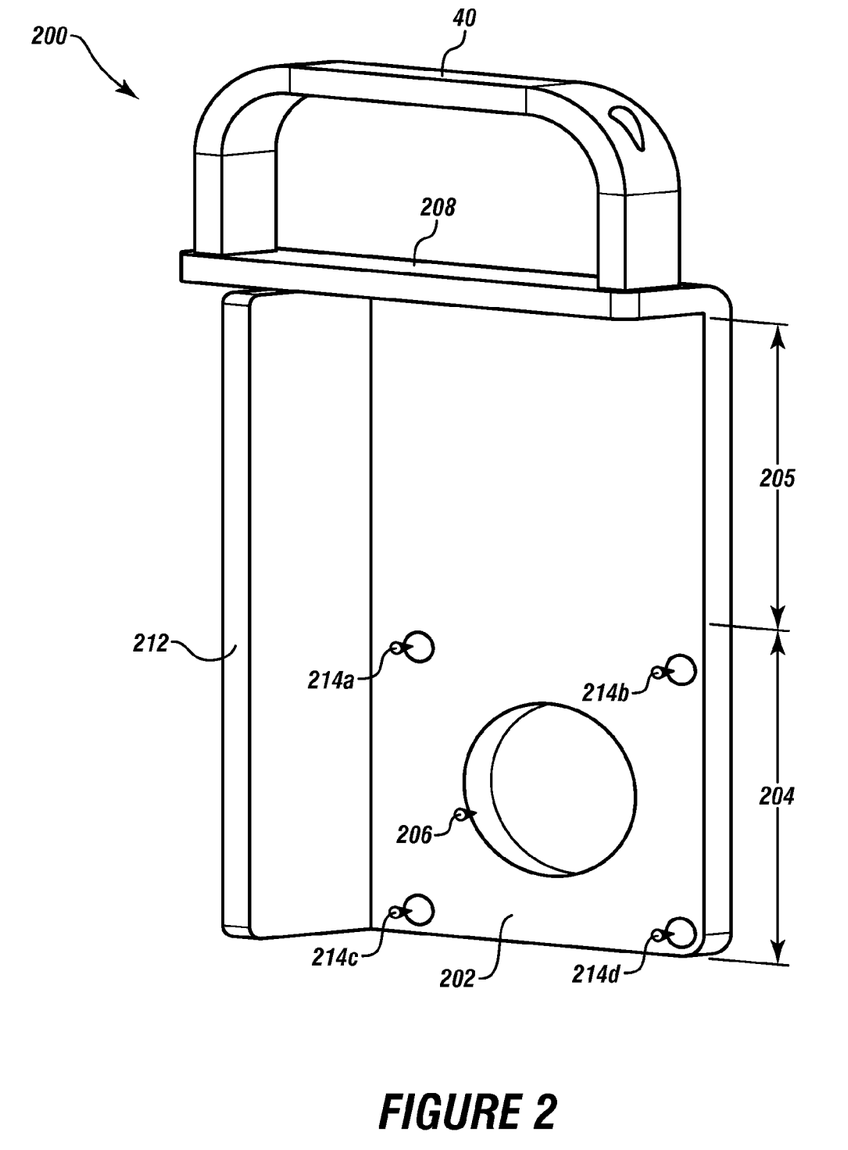
FIG. 2 depicts a control bracket.

FIG. 2 depicts an embodiment of the control bracket 200. The control bracket 200 can include the handle side 208, which can extend away from and be perpendicular to the control bracket base 202. The handle side 208 can support the handle 40. The handle side 208 can have a length ranging from about 4 inches to about 8 inches, a width ranging from about 1 inch to about 3 inches, and a thickness ranging from about ¼ of an inch to about ¾ of an inch.

The control bracket 200 can have a control box mount side 212 that can extend away from and be perpendicular to the control bracket base 202. The control box mount side 212 can have a length ranging from about 6 inches to about 10 inches, a width ranging from about 1 inch to about 3 inches, and a thickness ranging from about ¼ of an inch to about ¾ of an inch.

In operation, the control box mount side 212 can be used to provide engagement between the control bracket 200 and the motor control housing.

The control bracket base 202 can have a first portion 205 and a second portion 204. A hole 206 and one or more mounting holes 214a, 214b, 214c, and 214d can be disposed through the second portion 204, or through the first portion 205. The hole 206 can have a diameter ranging from about 1 inch to about 4 inches.

The mounting holes 214a, 214b, 214c, and 214d can have a diameter sufficient to support a fastener, such as a bolt and nut or a rivet. The control bracket base 202 can have from about 2 mounting holes to about 6 mounting holes. The mounting holes 214a, 214b, 214c, and 214d can be disposed equidistantly around the hole 206 in the second portion 204 of the control bracket base 202.

In operation, the mounting holes 214a, 214b, 214c, and 214d can each receive a fastener for mounting the control bracket 200 to the gear box. The hole 206 can allow the alignment tool to pass through the control bracket base 202.

In one or more embodiments, all parts of the portable racking tool can be easily removed from each other for easy repair and reconfiguration.

Figure 3A:
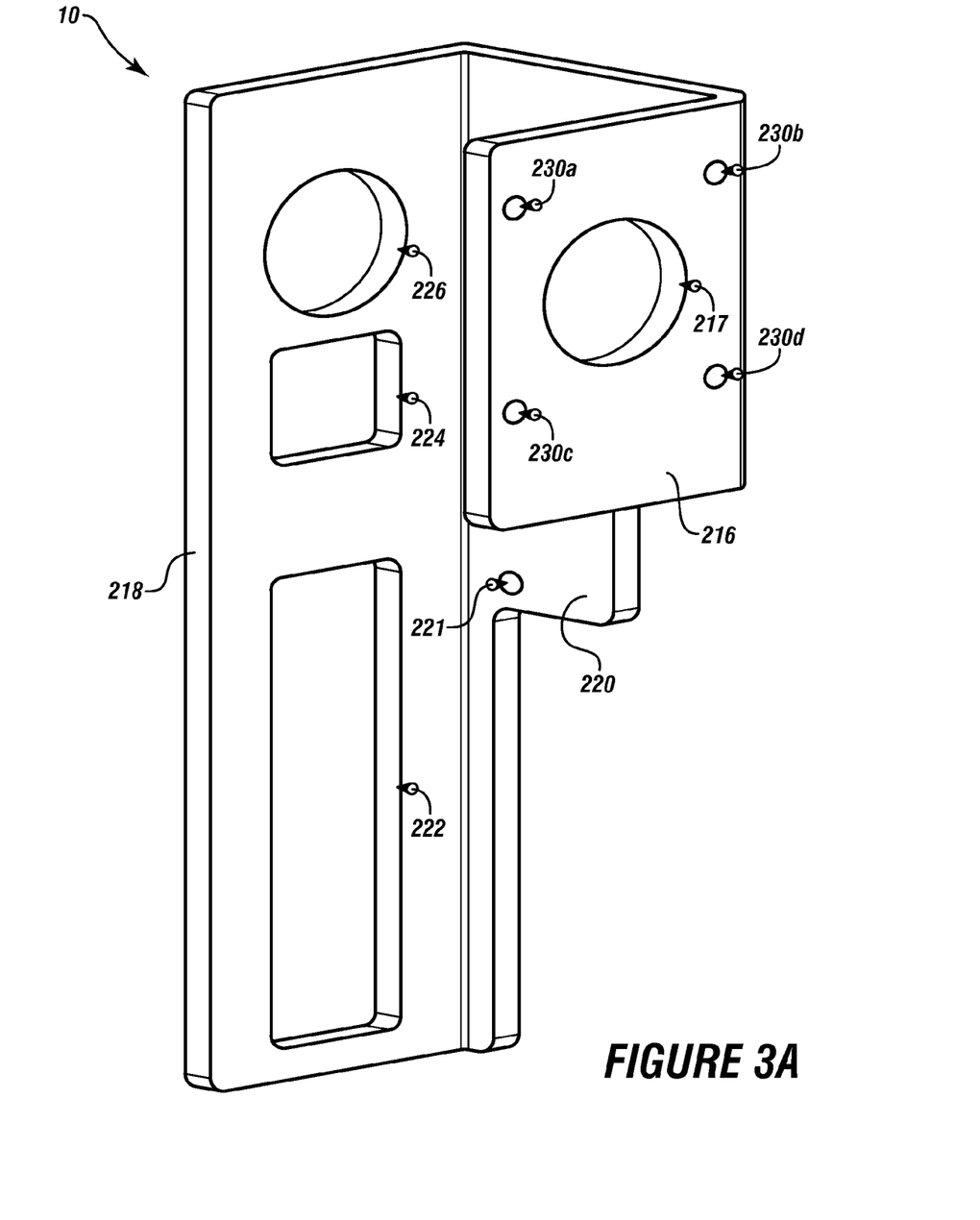
FIGS. 3A-3B depict a motor mount plate.
Figure 3B:
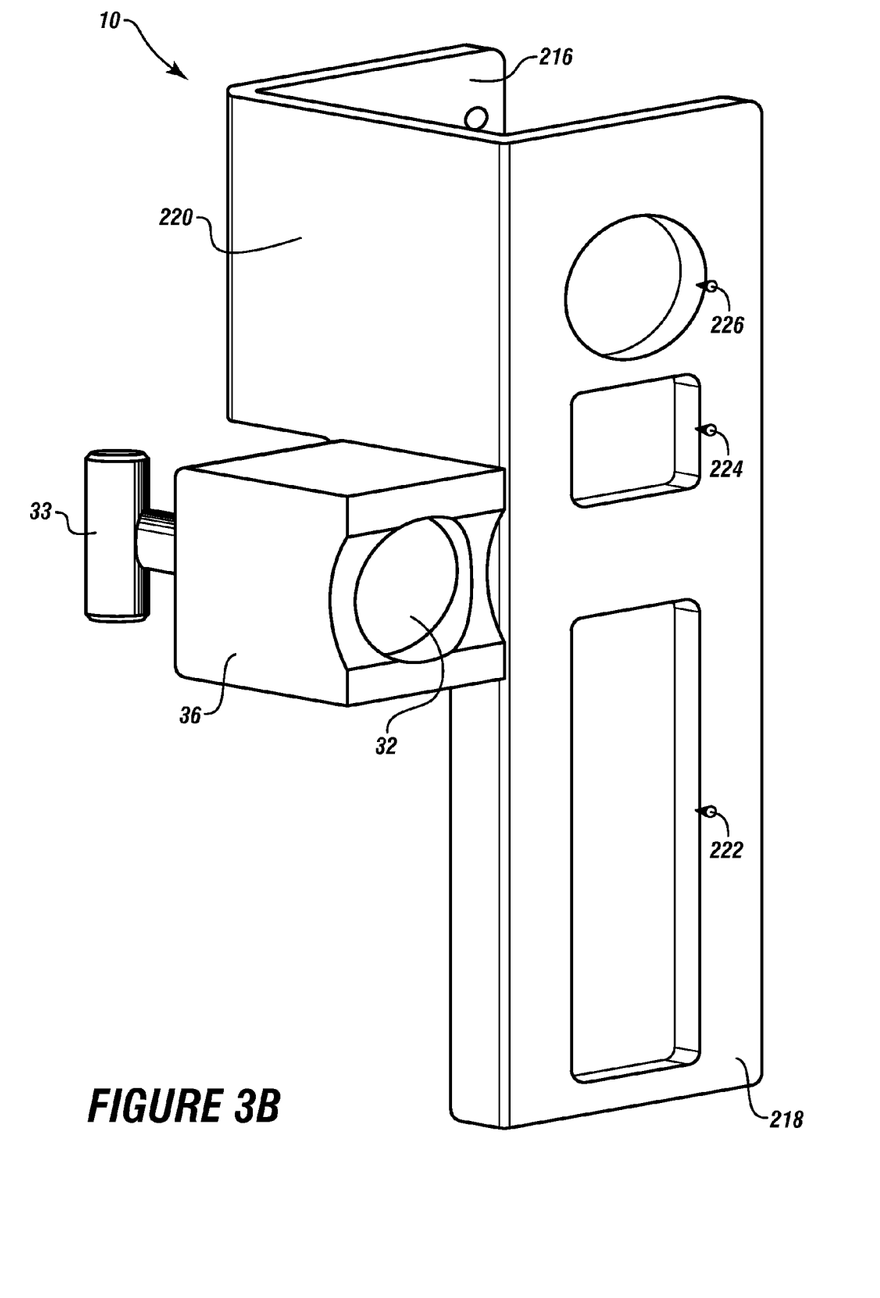

FIGS. 3A-3B depict the motor mount plate 10. The motor mount plate 10 can have a magnet side 220 connected between an electrical equipment side 218 and the motor side 216.

The magnet side 220 can have a width ranging from about 2 inches to about 4 inches, a length ranging from about 4 inches to about 6 inches, a thickness ranging from about ¼ of an inch to about ¾ of an inch, and can be made of steel plate.

The electrical equipment side 218 can have a width ranging from about 2 inches to about 4 inches, a length ranging from about 12 inches to about 17 inches, a thickness from about ¼ of an inch to about ¾ of an inch, and can be made of steel plate.

The motor side 216 can have a width ranging from about 2 inches to about 4 inches, a length ranging from about 2 inches to about 4 inches, a thickness ranging from about ¼ of an inch to about ¾ of an inch, and can be made of steel plate.

A motor side opening 217 can be disposed through the motor side 216 for receiving the alignment tool and allowing the alignment tool to engage the gear box. The motor side opening 217 can be aligned with the hole of the control bracket. The diameter of the motor side opening can be about the same as the diameter of the hole of the control bracket.

One or more motor mount holes 230a, 230b, 230c, and 230d can be disposed through the motor side 216 for receiving one or more fasteners. The motor mount holes 230a, 230b, 230c, and 230d can have diameters substantially similar to the mounting holes in the control bracket. The fasteners that can be engaged through the motor mount holes 230a, 230b, 230c, and 230d can be of the same type as those engaged through the mounting holes of the control bracket.

The magnet side 220 can have at least one magnet side mounting hole 221 for supporting the removable magnetically shielding magnet housing 36. The diameter of the magnet side mounting hole 221 can be configured to receive a fastener.

The removable magnetically shielding magnet housing 36 can retain a non-electric magnet 32 with a magnet handle 33. The removable magnetically shielding magnet housing 36 can be about 2 inches by about 3 inches.

The electrical equipment side 218 can have the first opening 222, the second opening 224, and the third opening 226 disposed therethrough.

Figure 4:
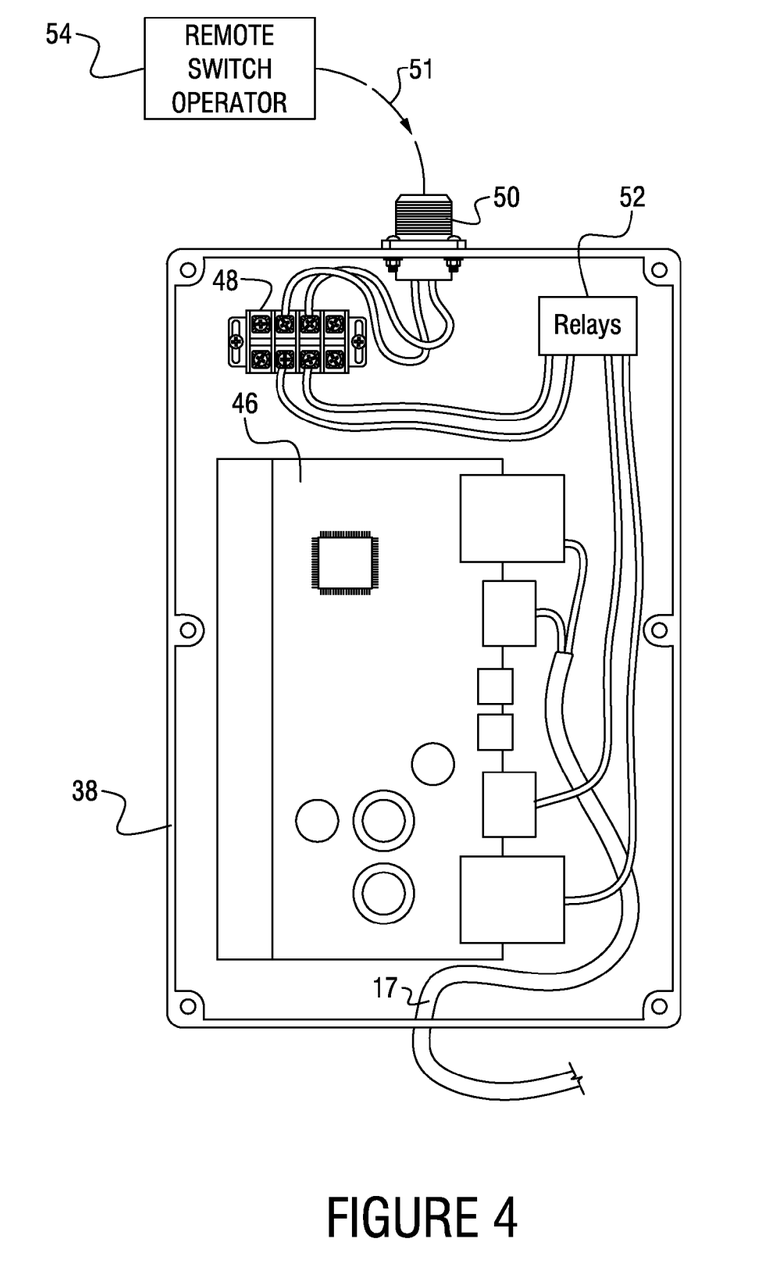
FIG. 4 depicts a motor control housing.

FIG. 4 depicts an embodiment of the motor control housing 38, which can be made of aluminum or another lightweight metal alloy. The motor control housing 38 can have a wall thickness ranging from about $1/16^{th}$ of an inch to about ¼ of an inch. The motor control housing 38 can have a back, four sides, and a removable top, all of which can be connected together.

The motor control housing 38 can receive power and control signals 51 from a power supply, which can be the remote switch operator 54. The power and control signals 51 from the remote switch operator 54 can be received through the interface plug 50.

Current can flow from the interface plug 50, through the electrical connectors 48, through motor relays 52, and to the motor control circuit board 46. The electrical connectors 48 and motor relays 52 can be those available from DK Controls of Argyle, Tex.

The motor control circuit board 46 can be one available from Oriental Motors USC Corp. of Los Angeles, Calif.

The power and control signals 51 can be sent to the motor control housing 38 using a power and communication cable 17, also available from Oriental Motors USC Corp. of Los Angeles, Calif. The power and control signals 51 can be used to control the motor.

Figure 5A:
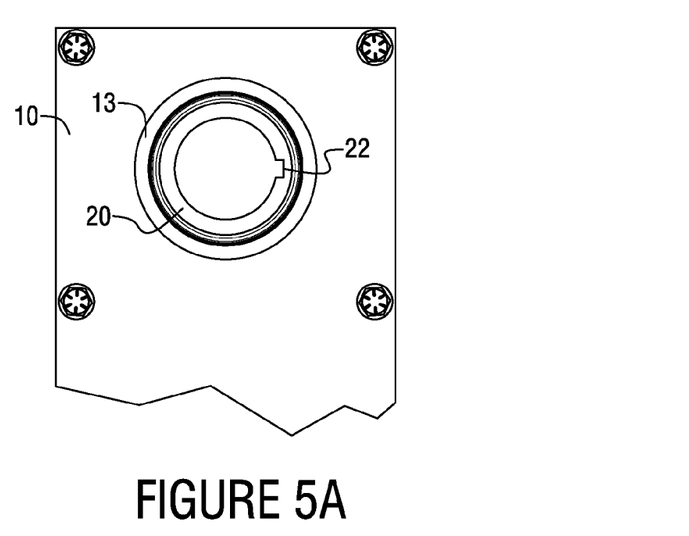
FIGS. 5A-5B depict a keyway and a rotatable shaft.
Figure 5B:
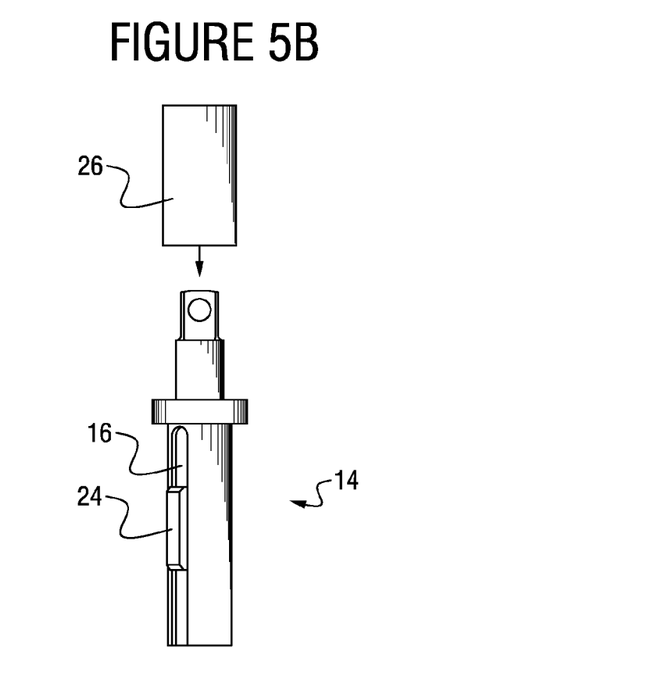

FIGS. 5A-5B depict a detailed view of the shaft keyway 16 which can engage with the gear box 13.

The gear box 13 can be mounted to the motor mount plate 10, and can have a shaft housing 20 and a gear box keyway 22 within the shaft housing 20.

In operation, the rotatable shaft 14 can be engaged within the shaft housing 20, and the key 24 in the shaft keyway 16 can be engaged within the gear box keyway 22. The rotatable shaft 14 can be engaged with a coupling 26 opposite the gear box 13.

Figure 6:
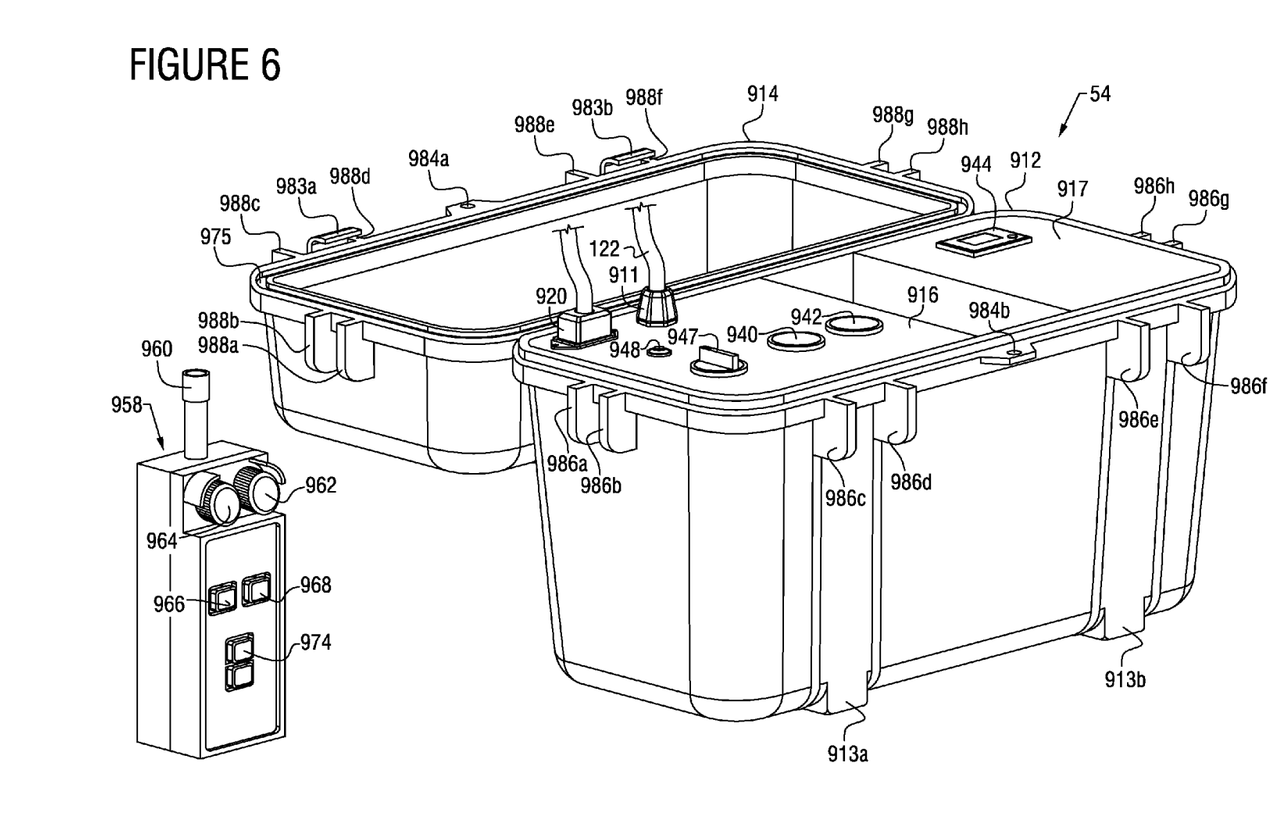
FIG. 6 depicts a remote switch operator.

FIG. 6 depicts an embodiment of a remote switch operator 54. The remote switch operator 54 can be used to remotely operate the portable racking tool.

The remote switch operator 54 can have a housing with a body 912 and a lid 914, which can be opened and closed over the body 912.

The body 912 can have one or more body ribs 986*a*, 986*b*, 986*c*, 986*d*, 986*e*, 986*f*, 986*g*, and 986*h* that can provide support for the body 912.

The body 912 can have one or more feet 913*a* and 913*b* that can provide clearance from the ground if the housing is placed near water or other substances.

The lid 914 can have one or more lid ribs 988*a*, 988*b*, 988*c*, 988*d*, 988*e*, 988*f*, 988*g*, and 988*h* that can provide support to the lid 914.

The lid 914 can have one or more latches 983*a* and 983*b* that can be used to hold the lid 914 to the body 912.

Connectors 984*a* and 984*b* can be used to lock the lid 914 to the body 912.

The lid 914 can have a groove 975 that can retain a sealing member, such as an elastomeric gasket, to provide a sealed engagement between the lid 914 and the body 912.

A first face plate 916 and a second face plate 917 can be mounted within the body 912. The second face plate 917 can have a current control module 944.

The first face plate 916 can have a remove momentary push button 942, an install momentary push button 940, an on/off switch 947, and a circuit breaker 948.

The first face plate 916 can also have a power plug 920, and a power and signal plug 911 in communication with a power cord 122. The power and signal plug 911 can transmit power and signals from the remote switch operator 54 to the portable racking tool.

A remote control device 958 can be used the control the remote switch operator 54. The remote control device 958 can have a remote off-button 964, a remote on-button 962, a remote install button 966, a remote remove button 968, an automatic shut off switch 974, and an antenna 960.

The remote control device 958 can be used by operators to remotely control the remote switch operator 54. The automatic shut off switch 974 can disable the portable racking tool when the portable racking tool exceeds a preset amperage.

Figure 7:
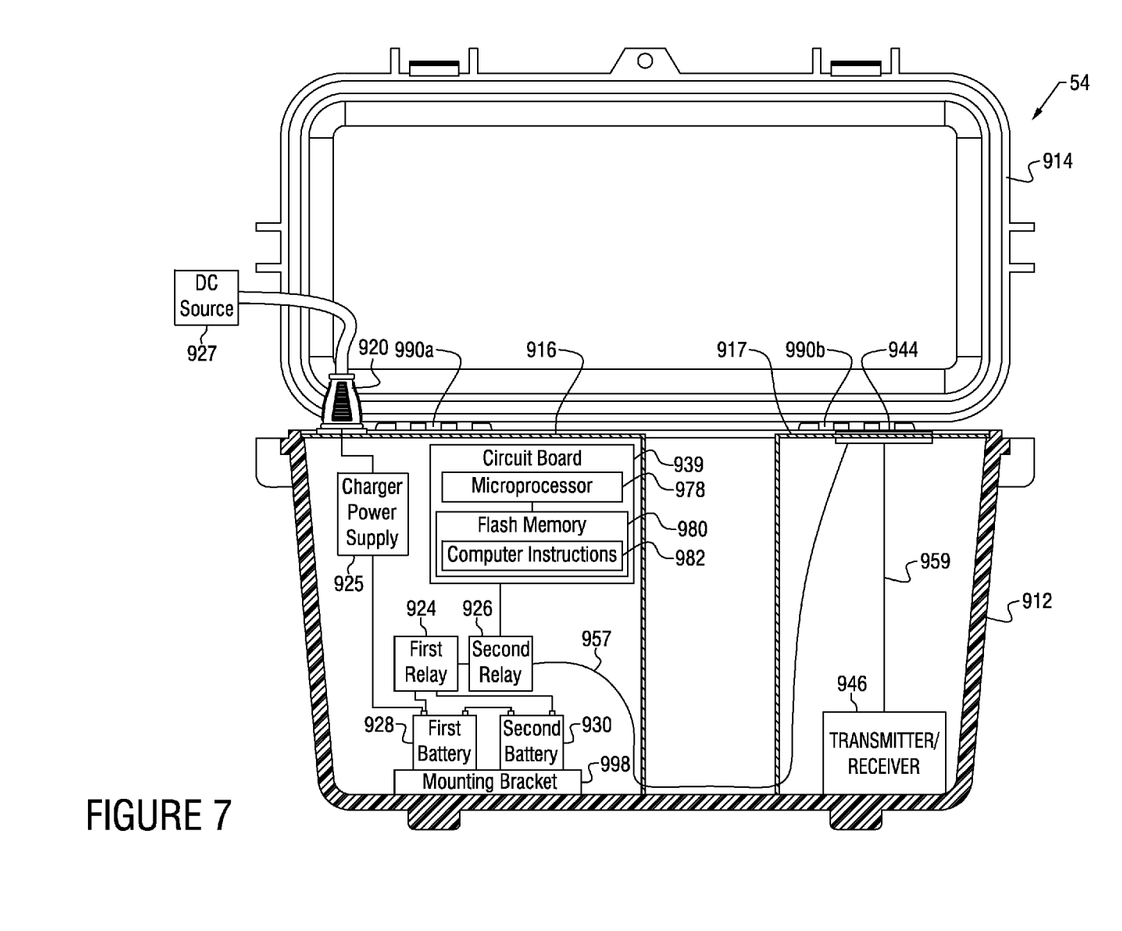
FIG. 7 depicts a diagram of components of the remote switch operator.

FIG. 7 depicts a cutaway view of the remote switch operator 54. The lid 914 is depicted opened relative to the body 912 with one or more hinges 990*a* and 990*b*.

A transmitter/receiver 946 can transmit or receive signals from the remote control device, which can be a radio controller. The transmitter/receiver 946 can be in communication with the current control module 944 on the second plate 917 through a first cable 959.

The current control module 944 can be in communication with a second relay 926 through a second cable 957. The current control module 944 can send electricity and signals from the transmitter/receiver 946 to the second relay 926.

The second relay 926 can be in communication with a circuit board 939. The second relay 946 can send electricity and signals from the transmitter/receiver 946 to the circuit board 939. The circuit board 939 can have a microprocessor 978, and a flash memory 980 with computer instructions 982.

The circuit board 939 can control the various electrical components under the first face plate 916. For example, the circuit board 939 can control the buttons on the first face plate 916, to increase or decrease an amperage.

In one or more embodiments, the computer instructions 982 can provide instructions to monitor the current passing through the remote switch operator 54. The computer instructions 982 can also contain preset amperage limits for automatic shut off of the motor on the portable racking tool.

The second relay 926 can be in communication with a first relay 924. The second relay 926 can send electricity and signals from the transmitter/receiver 946 to the first relay 924.

The first relay 924 can be in communication with a first battery 928 and a second battery 930. The first battery 928 and the second battery 930 can be in communication with each other, and can both be mounted to a mounting bracket 998.

The first battery 928 can be in communication with a charge power supply 925, which can be in communication with a DC source 927 through the power plug 920.

Figure 8:
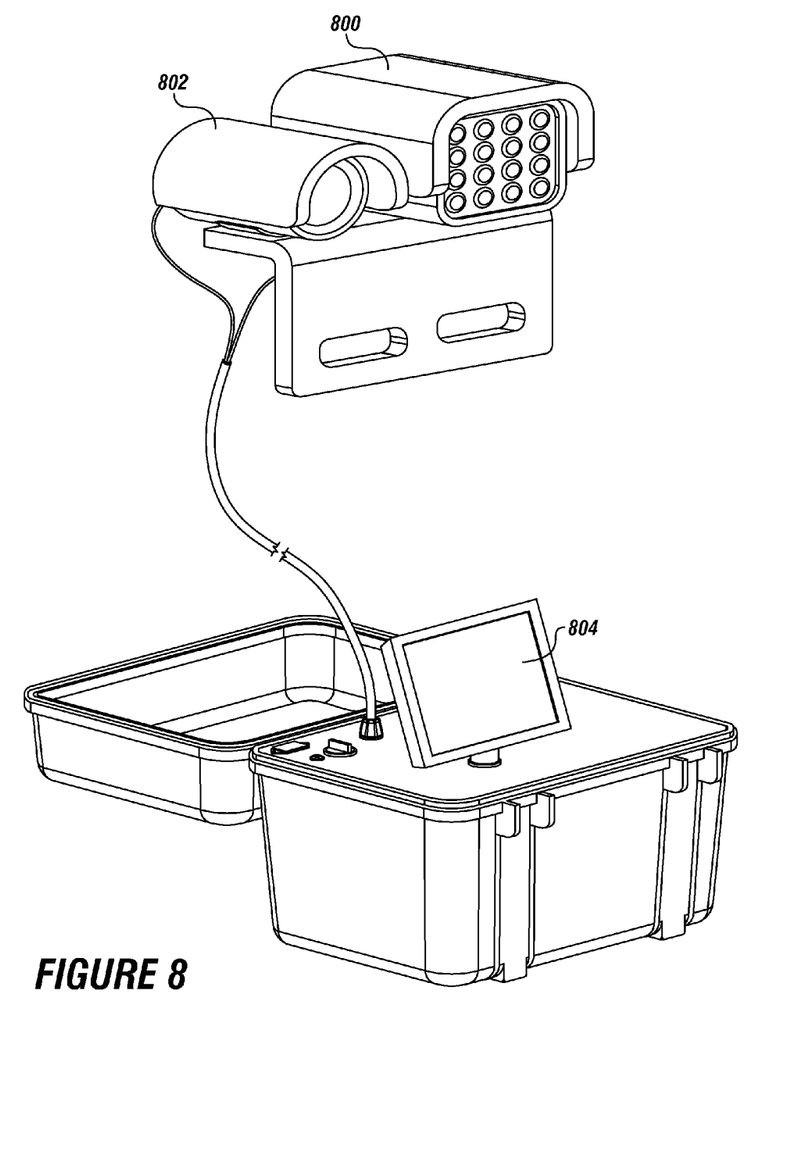
FIG. 8 depicts a camera, light, and monitor usable to remotely monitor the operation of the portable racking tool.

FIG. 8 depicts a camera 802, a light 800, and a monitor 804, which can be used to remotely monitor the portable racking tool without an operator having to enter the arc flash zone.

For example, an operator can view the portable racking tool from a remote location using the monitor 804 in communication with the camera 802. The light 800 can allow the camera 802 to have improved viewing of the portable racking tool within an arc flash zone.

Figure 9:
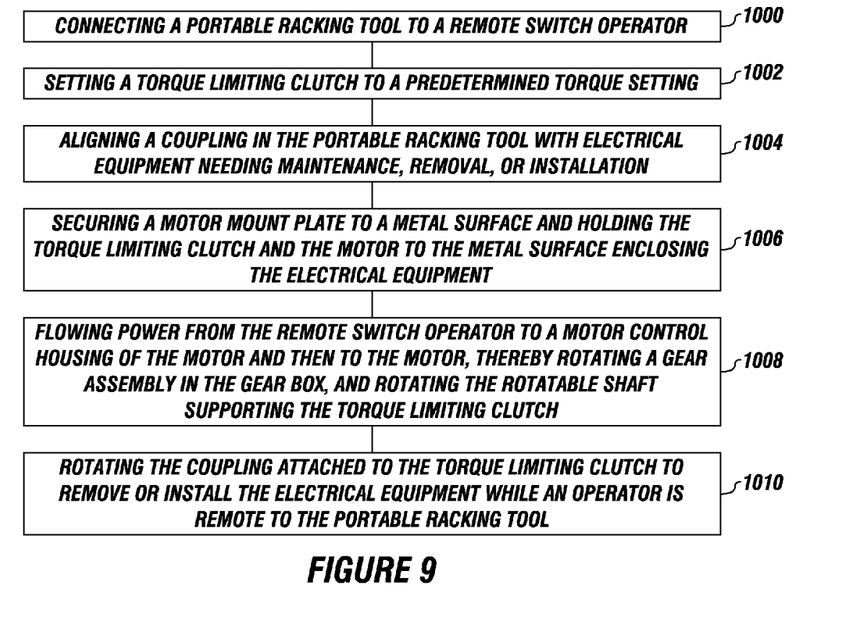
FIG. 9 depicts an embodiment of a method that can be implemented using one or more embodiments of the portable racking tool.

FIG. 9 depicts an embodiment of a method for racking electrical equipment that can be implemented using one or more embodiments of the racking tool disclosed herein.

The method can include connecting a portable racking tool to a remote switch operator, as illustrated by box 1000.

For example, wireless or wired communication can be provided between the portable racking tool and the remote switch operator, allowing power and control signals to be transmitted therebetween.

The method can include setting a torque limiting clutch to a predetermined torque setting, as illustrated by box 1002.

For example, the predetermined torque setting can be set based upon the particular piece of electrical equipment being operated upon, and based upon the particular operation being performed on the piece of electrical equipment.

The method can include aligning a coupling in the portable racking tool with electrical equipment needing maintenance, removal, or installation, as illustrated by box 1004.

For example, an alignment tool can be engaged with the gear box. The alignment tool can be rotated to rotate the coupling to be aligned with the electrical equipment.

The method can include securing a motor mount plate to a metal surface and holding the torque limiting clutch and the motor to the metal surface enclosing the electrical equipment, as illustrated by box 1006.

For example, the portable racking tool can be secured to the metal surface enclosing the electrical equipment using a non-electric magnet on the portable racking tool. The torque limiting clutch and/or the motor can be attached to the motor mount plate.

The method can include flowing power from the remote switch operator to a motor control housing of the motor and then to the motor, thereby rotating a gear assembly in the gear box, and rotating the rotatable shaft supporting the torque limiting clutch, as illustrated by box 1008.

The method can include rotating the coupling attached to the torque limiting clutch to remove or install the electrical equipment while an operator is remote to the portable racking tool, as illustrated by box 1010.

For example, the operator can remotely select an install or remove button, which can be transmitted from the remote switch operator to the motor control housing and then to the motor. The motor can then initiate the gear assembly of the gear box, which can rotate the rotatable shaft and the torque limiting clutch, thereby operating upon the electrical equipment to install or remove the electrical equipment.

While these embodiments have been described with emphasis on the embodiments, it should be understood that within the scope of the appended claims, the embodiments might be practiced other than as specifically described herein.

What is claimed is:

1. A portable racking tool for removing or installing electrical equipment surrounded by a metal surface, wherein the portable racking tool comprises:
   a. a motor mount plate comprising:
      (i) a motor side comprising a motor side opening;
      (ii) an electrical equipment side comprising a first opening for engaging an electrical equipment handle attached to the electrical equipment, a second opening allowing viewing of an indicator on the electrical equipment, and a third opening allowing a coupling to pass through the motor mount plate to the electrical equipment; and
      (iii) a magnet side having at least one magnet side mounting hole, wherein the magnet side is disposed between the motor side and the electrical equipment side;
   b. a motor mounted to the motor mount plate and rotatably engaged with a gear box, wherein the gear box comprises a shaft housing;
   c. a rotatable shaft with a shaft keyway, wherein the rotatable shaft extends through the motor mount plate for receiving torque from the gear box, wherein the gear box is configured to rotate the rotatable shaft, wherein the rotatable shaft is engaged with a torque limiting clutch, and wherein the coupling is connected to the torque limiting clutch on one end of the coupling and capable of being connected to the electrical equipment on another end of the coupling;
   d. a gear box keyway disposed in the shaft housing;
   e. a key configured to engage the gear box keyway and the shaft keyway;
   f. a control bracket mounted to the motor;
   g. a motor control housing secured to the control bracket, wherein the motor control housing comprises:
      (i) an interface plug configured to receive signals and power from a remote switch operator; and
      (ii) a motor control circuit board connected to the interface plug configured to transmit the signals and power to the motor;
   h. an alignment tool engaged with the rotatable shaft through the motor mount plate, wherein the alignment tool is configured to rotate the coupling to align the coupling with the electrical equipment.

2. The portable racking tool of claim 1, wherein the control bracket comprises:
   a. a control bracket base having a hole;
   b. a handle side connected to the control bracket base; and
   c. a control box mount side connected to the control bracket base.

3. The portable racking tool of claim 2, further comprising a plurality of mounting holes disposed around the hole in the control bracket base.

4. The portable racking tool of claim 2, wherein the handle side and the control bracket base are a one-piece structure.

5. The portable racking tool of claim 2, further comprising a handle connected to the handle side.

6. The portable racking tool of claim 5, wherein the handle extends beyond the control box mount side.

7. The portable racking tool of claim 1, further comprising:
   a. a removable magnetically shielding magnet housing mounted to the at least one magnet side mounting hole; and
   b. a non-electric magnet contained within the removable magnetically shielding magnet housing, wherein the non-electric magnet is movable, removable, and engagable with the metal surface, wherein the non-electric magnet has a magnet face for attaching to the metal surface surrounding the electrical equipment, and wherein the non-electric magnet reduces vibration and torque between the motor mount plate and the metal surface surrounding the electrical equipment.

8. The portable racking tool of claim 7, wherein the non-electric magnet comprises a magnet handle, and wherein the magnet handle is configured to at least partially rotate the non-electric magnet into and out of the removable magnetically shielding magnet housing.

9. The portable racking tool of claim 1, further comprising a plurality of motor mount mounting holes disposed through the motor side for mounting the motor in the motor side opening.

10. The portable racking tool of claim 1, wherein the electrical equipment side is at a right angle to the magnet side, the motor side is at a right angle to the magnet side, the motor side extends parallel to the electrical equipment side, or combinations thereof.

11. The portable racking tool of claim 1, wherein the motor mount plate and the control bracket are formed from a lightweight metal.

12. The portable racking tool of claim 11, wherein the lightweight metal is a plate that is from $\frac{1}{16}$th of an inch to $\frac{1}{2}$ of an inch thick, and wherein the lightweight metal comprises: steel, or stainless steel alloy.

13. The portable racking tool of claim 1, wherein the control bracket has a width and length that extends over both the gear box and the motor.

14. The portable racking tool of claim 1, wherein the rotatable shaft is from 2 inches to 8 inches in length and has a diameter configured to fit within the gear box.

15. The portable racking tool of claim 1, further comprising a power cord configured to provide the signals and power from the remote switch operator to the interface plug.

16. The portable racking tool of claim 1, further comprising a camera with lights in wireless communication with a remote monitor enabling an operator to safely view operation of the portable racking tool while remaining outside of an arc flash zone.

17. The portable racking tool of claim 1, wherein the portable racking tool is modular, and wherein each component of the portable racking tool is removable and replaceable.

18. The portable racking tool of claim 15, in combination with a remote switch operator, wherein the remote switch operator comprises:
   a. a housing with a body and a lid;

b. a first face plate and a second face plate within the housing;
c. a power plug in the first face plate configured to provide current from an AC or DC outside source;
d. a charger power supply in the housing beneath the first face plate for receiving current from the AC or DC outside source;
e. a power and signal plug configured to transmit the signals and power to the portable racking tool using the power cord;
f. a battery disposed beneath the first face plate;
g. a relay connected to the battery;
h. a circuit board connected to the relay and the battery, wherein the circuit board comprises a microprocessor, a flash memory, and computer instructions stored in the flash memory;
i. an install momentary push button engaged with the circuit board;
j. a remove momentary push button engaged with the circuit board;
k. an on/off switch for connecting or disconnecting the battery;
l. a circuit breaker connected between the battery and the circuit board;
m. a current control module disposed in the second face plate and connected to the relay and a transmitter/receiver; and
n. a remote control device for sending and receiving signals to the transmitter/receiver, wherein the remote control device comprises an antenna, a remote on-button, a remote off-button, a remote install button, a remote remove button, and an automatic shut off switch, and wherein the automatic shut off switch disables the portable racking tool when the portable racking tool exceeds a preset amperage.

* * * * *